United States Patent [19]

Baxter

[11] Patent Number: 4,605,525
[45] Date of Patent: Aug. 12, 1986

[54] METHOD FOR FORMING INSULATING ELECTRICAL CONDUCTOR

[75] Inventor: Gordon D. Baxter, Kingston, Canada

[73] Assignee: Northern Telecom Limited, Montreal, Canada

[21] Appl. No.: 697,805

[22] Filed: Feb. 4, 1985

[51] Int. Cl.$^4$ .................................................. B29C 47/92
[52] U.S. Cl. .................................. 264/40.5; 264/40.1; 264/40.7; 264/174; 425/114; 425/140; 425/141
[58] Field of Search .................... 264/40.1, 40.7, 174, 264/40.5; 425/141, 113, 114, 140, 135

[56] References Cited

U.S. PATENT DOCUMENTS

| | | | |
|---|---|---|---|
| 3,288,895 | 11/1966 | Windeler | 264/40.2 |
| 3,290,995 | 12/1966 | Pull | 264/40.5 |
| 3,402,696 | 9/1968 | Richards | 425/113 |
| 3,433,858 | 3/1969 | Bauer et al. | 264/40.2 |
| 3,914,356 | 10/1975 | Dembiak | 264/40.5 |
| 4,086,044 | 4/1978 | Sikora | 264/40.2 |

FOREIGN PATENT DOCUMENTS

| | | | |
|---|---|---|---|
| 2257938 | 6/1974 | Fed. Rep. of Germany | 425/113 |
| 2157051 | 6/1973 | France | 264/40.2 |
| 47-14193 | 4/1972 | Japan | 425/113 |
| 57-207046 | 12/1982 | Japan | 264/174 |

Primary Examiner—Jeffery Thurlow
Attorney, Agent, or Firm—R. J. Austin

[57] ABSTRACT

Providing an insulation layer upon electrical conductor by passing the conductor with clearance towards and through an outlet orifice of a die insert as the conductor approaches a die orifice. The degree of concentricity of the conductor within the insulation layer is monitored after extrusion and an eccentrically positioned conductor is moved towards a concentric location by moving the conductor, at a position upstream of the outlet orifice of the die insert, laterally of the feedpath. This movement effects a change in approach of the conductor to the outlet orifice and influences a change in the angle of departure from the outlet orifice thereby altering the lateral position of the conductor within the die orifice.

3 Claims, 6 Drawing Figures

METHOD FOR FORMING INSULATING ELECTRICAL CONDUCTOR

This invention relates to the insulating of electrical conductors.

In the provision of an insulating layer upon an electrical conductor wire (referred to herein as "electrical conductor"), it is conventional practice to feed the conductor through an extruder orifice while surrounding it with elastomeric extrudate which after cooling forms a dielectric material.

A problem with coating a conductor in this manner is that it is extremely difficult to locate and to hold the conductor concentrically disposed within the extrudate during the coating procedure. Known conductor position adjustment apparatus is not sufficiently sensitive in operation to provide a substantially continuous concentricity of conductor and extrudate, particularly as in the case of conductor insulation, the insulation is extremely thin, e.g. around 7 mm for 22 or 24 AWG conductor wire. This thickness allows for a tolerance only of the order of ±0.0001 inches.

In the manufacture of cable cores, various means are known for providing substantial concentricity of a core within a jacket material during extrusion. In such apparatus, it is known to pass the core through a die insert at a die orifice. To provide substantial concentricity, die inserts are movable laterally of their die orifices so as to move their cores radially for adjustment purposes. Apparatus operating in this manner is described in U.S. Pat. No. 4,551,087 granted Nov. 5, 1985 and entitled "Extrusion Apparatus" in the names of A. Pan and K. S. Cohrs. Such apparatus is suitable for providing substantial concentricity of a core within a jacket, because the tolerance for the location of the core within the jacket may be of the order of ±0.005 inches for a thickness of around 40 mil. However the differences in diameter between the jacket and a conductor insulation layer is such that the apparatus referred to in the U.S. patent while being suitable for providing concentricity of a core, would not provide sufficiently small degrees of movement or control for concentrically locating a conductor within a small thickness insulation layer.

The present invention is concerned with a method and apparatus for providing an insulation layer upon an electrical conductor in the use of which substantial concentricity of the conductor within the layer is achieved.

According to one aspect of the present invention, there is provided a method of forming an insulation layer upon an electrical conductor comprising: passing the conductor along a feedpath, with clearance, towards an outlet orifice of a die insert and also with clearance, through the outlet orifice while lying in contact with a part only of a surface of the insert which defines the orifice and passing the conductor through a die orifice to extrude onto it elastomeric material for forming the layer; monitoring the radial position of the conductor within the layer; and controllably moving the conductor laterally of its feedpath at a position upstream from the outlet orifice of the die insert dependent upon the eccentricity of the conductor within the layer so as to cause the conductor to change its angle of approach to the outlet orifice and alter the angle of departure of the conductor from the outlet orifice and hence alter its lateral position within the die orifice.

In the above method, it is preferable to obtain the desired change in angle of departure by providing for lateral movement of the conductor in two planes.

According to a further aspect of the present invention apparatus is provided for forming an insulating layer upon an electrical conductor comprising an extruder having an extruder head provided with a die orifice and a die insert within the head, the insert having an outlet orifice for passage of the conductor along its feedpath towards the die orifice, and upstream of the outlet orifice, the apparatus defines a passage of larger section than the outlet orifice to allow for lateral clearance for the conductor on its feedpath, monitoring means to monitor the radial position of the conductor within the layer, and means to controllably move the conductor laterally of its feedpath within the larger section passage so as to change the angle of approach of the conductor towards the outlet orifice.

One embodiment of the invention will now be described, by way of example, with reference to the accompanying drawings in which.

Figure 1:
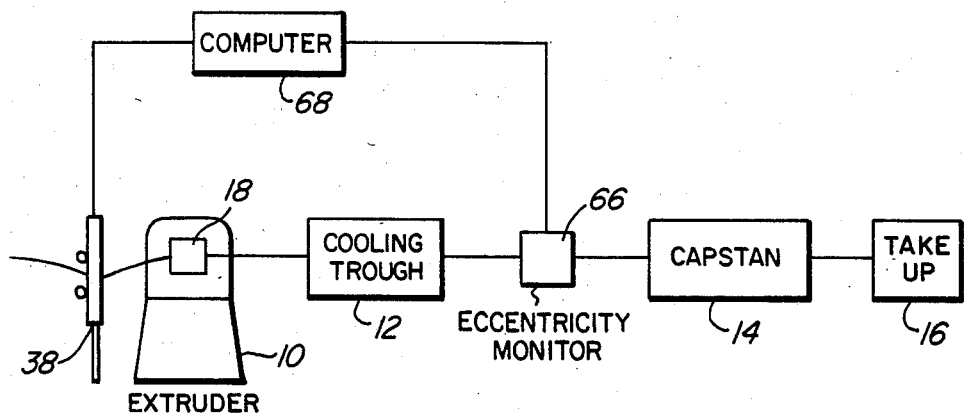
FIG. 1 is a diagrammatic side elevational view of apparatus for forming an insulating layer upon an electrical conductor.

As shown by FIG. 1, apparatus for forming an insulating layer upon an electrical conductor comprises an extruder 10 in line with a cooling trough 12 for the applied insulation, a capstan 14 and takeup device 16. All of these parts of the apparatus are conventional except for the extruder head which is now to be described.

Figure 2:
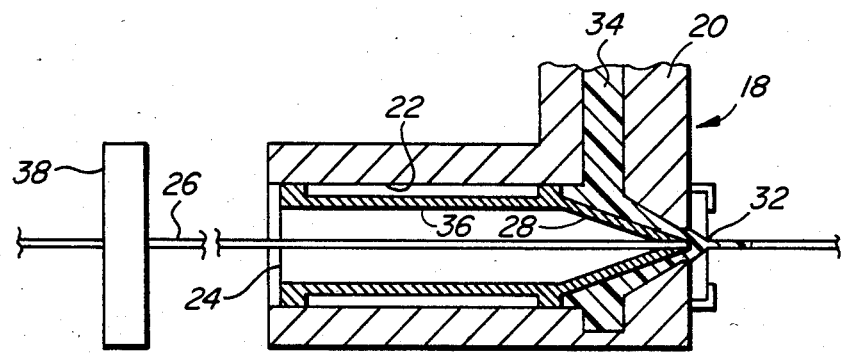
FIG. 2 is a cross-sectional view in side elevation of an extruder head used in the apparatus of FIG. 1 and shown on a larger scale.
Figure 3:
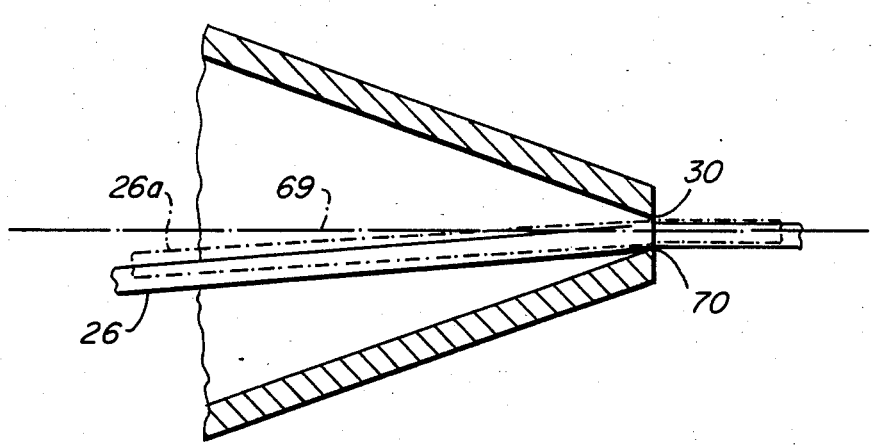
FIG. 3 is on a larger scale than FIG. 2 and is a section through part of the extruder head showing a die insert in greater detail than in FIG. 2.

The extruder comprises an extruder head 18 which as shown by FIGS. 2 and 3, comprises a housing 20 with a substantially cylindrical chamber 22 within which is disposed a die insert 24. The die insert is a hollow member formed with a bore or passage 36, as shown by FIGS. 2 and 3, and extends along the feedpath for a conductor 26 as it is fed through the extruder. A downstream end 28 of the insert is tapered and is formed directly at the end with an outlet orifice 30 which lies adjacent to a die orifice 32 of the extruder head. The die orifice 32 is connected with the extruder in conventional fashion by passageways 34 which extend into the head and surround the tapered portion 28 of the die insert. The die insert is in a fixed position within the head with its outlet orifice 30 substantially aligned with the die orifice 32. As is clear from FIGS. 2 and 3, the passage 36 in the die insert 28 has a diameter substantially greater than the diameter of the outlet orifice 30 and the bore and the outlet orifice merge together along the tapered section 28.

Figure 4:
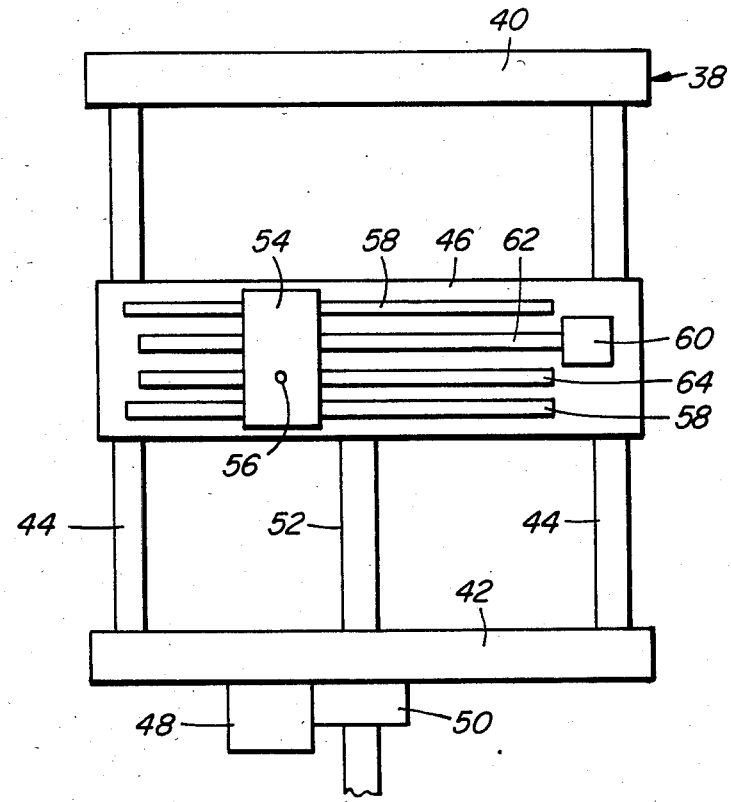
FIG. 4 is an end view in the direction of arrow 4 in FIG. 2 of a means for controllably moving the conductor laterally of its feedpath as it moves towards the die insert.

Means 38 is provided to controllably move the conductor laterally of its feedpath at a position upstream from the outlet orifice 30. As shown by FIG. 1, the means 38 is disposed directly upstream from the extruder head 18. As shown by FIG. 4 the means 38 comprises a fixed rectangular frame formed by vertically spaced upper and lower horizontally disposed frame members 40 and 42 between which are disposed two horizontally spaced vertical guides 44. On the two guides 44 is mounted a vertically displaceable mounting member 46 the vertical position of which is controlled by a stepper motor 48 secured to the frame member 42. The stepper motor 48 is operably connected to the mounting member 46 by gearing 50 which is connected to a screw threaded shaft 52 connected to the mounting member 46. Rotation of the stepper motor in one direction or the other, results in the vertical movement of the mounting member in the appropriate direction.

Mounted upon the mounting member 46 is a conductor position control member 54 which is formed with an orifice 56 for comfortable passage of the conductor 26. The control member 54 is mounted for horizontal movement upon horizontal guides 58 secured to the mounting member 46. The control member 54 is moved horizontally by a stepper motor 60 which is secured to the mounting member 46 and which is drivably connected to the control member by a screw threaded drive shaft 62 connected to the control member through suitable gearing not shown.

The mounting member 46 is formed with a horizontal slot 64 through which the orifice 56 is directed at any position of the control member 54. Thus the conductor 26 may pass through the orifice 56 at any position of the mounting member 46 or of the control member 54 without interfering with any part of the means 38 except for the sides of the orifice 56.

Downstream from the cooling trough 12 is disposed a conventional means 66 for measuring, at spaced intervals around the conductor circumference, the thickness of the layer of insulation formed on the conductor. Thus the means 66 provides a means for monitoring the radial position of the conductor within the layer. The measuring means 66 is of well known construction and may be of a laser or beta gauge measuring type. Upon measurements being made by the means 66, electrical signals are sent to a control in the form of a microprocesser 68. These signals are compared with one another and with a data signal corresponding to the desired thickness of the insulation. Upon signal comparison if it is clear that parts of the insulation are thicker than others, then the computer generates a signal which is sent to the appropriate stepper motor 48 or 60. Appropriate movement of the control member 54 of mounting member 46 either vertically or horizontally or both, as the case may be, to have an effect on the position of the conductor as it passes through the die orifice 32.

In practice, the die insert with its outlet orifice 30 controls the position of the conductor 26 in a non-conventional fashion. In this particular invention, it is a requirement that there is a slight clearance between the surface of the die insert forming the outlet orifice 30 and the conductor. As an example, in this particular embodiment, with a 24 or 26 AWG conductor, then sufficient clearance is provided by an outlet orifice having a diameter which is approximately 0.0005 mil greater than the diameter of the conductor. As can be seen from FIG. 3, the central position for the feedpath is shown at 69 and theoretically this is the ideal position for the conductor to move along on its way through the die orifice. However, in practice it is found that the die insert may not be absolutely concentrically disposed with regard to the die orifice which may account for some eccentricity of the conductor within the finished insulating layer. In addition to this, the extrudate in moving through the passage 34 towards the die orifice 32 surrounds the die insert in the passage 34 as shown by FIG. 2 before movement towards the die orifice. Movement of the extrudate in this fashion is to some degree uncontrollable, and various forces are involved caused by the flow of the material such that lateral loadings in unspecified directions may be applied to the conductor upon it coming into contact with the extrudate at the die orifice. Such forces also play a part in displacing the conductor from its true concentric position.

With the present invention, such problems are overcome by avoiding movement of the insert itself as such movement would be too coarse for centralizing degrees of such a narrow diameter conductor within an extremely thin layer of insulation. As shown by the embodiment and according to the invention, the conductor is passed through the outlet orifice 30 by being held against a surface part 70 of the insert which defines the outlet orifice 30. As can be seen by FIG. 3 particularly, this involves the location of the conductor within the die insert in a position slightly away from the true central position 69 for the feedpath. The conductor therefore approaches the outlet orifice 30 at a certain angle of approach which causes it to contact the die insert surface at part 70 and also causes the conductor to move away from the part 70 at a certain angle of departure. This angle of departure dictates the position of the conductor as it moves through the die orifice 32. Thus, if the angle of approach of the conductor towards the outlet orifice 30 should change, then the angle of departure from the orifice will also change. A change in the angle of approach may also change the position at which the conductor engages the die insert surface surrounding the outlet orifice 30. The conductor may thus move away from contact with part 70 shown in FIG. 3 and may contact some other portion of the die insert surface, for instance as shown at 72 in FIG. 5. In this figure, the full outline position of the conductor 26 corresponds to the full outline position in FIG. 3 whereas the chain dotted outline position in FIG. 5 indicates some other position into which the conductor may move after changing angle of approach towards the outlet orifice 30. Thus as shown in FIG. 3, with the conductor at the exaggerated angle of approach illustrated therein, the angle of departure may be such as to dispose the conductor 26 slightly away from a concentric position with the extrudate. The movement of the conductor for instance to a chain dotted position 26a in FIG. 3 alters its angle of approach towards the outlet orifice. This has the effect of altering its angle of departure through the orifice so that the conductor becomes aligned concentrically with the extrusion orifice to produce a concentrically arranged insulation layer.

The movement of the conductor in this fashion upon demand is controlled by the means 38. As indicated above, the means 66 provides signals to the computer 68 which causes movement of either of the motors 48 or 60 to control the horizontal and vertical position of the orifice 56. Of course even if the conductor is disposed concentrically with the outlet orifice at any particular moment for a certain angle of approach towards the outlet orifice of the die insert, then this is no guarantee that the concentricity will be maintained if the means 38 is not adjusted. Changes in forces by the extrudate upon the conductor may be sufficient to cause slight lateral movement within the die orifice and destroy this concentricity. Upon this occurring however, the computer receives signals from the means 66 to cause movement of the member 46 or the control member 54 to reposition the orifice 56 so that a new angle of approach to the outlet orifice is found which will then provide the concentric position of the conductor moving through the die orifice.

The above apparatus and process are commercially acceptable ways of maintaining concentricity of the conductor within its insulation even though extremely slight degrees of eccentricity are normally found. The invention is commercially workable even though it is based on the concept that the conductor need not be perfectly located upon the true concentric feedpath 69 as it moves towards the die orifice. In contrast the present invention is workable because of the clearance provided between the conductor and the sides of the outlet orifice 30 and because the angle of approach into contact with a part of the sides of the orifice controls the angle of departure from that orifice.

The method according to the invention may be controlled by a computer arrangement as shown in the first embodiment which involves the use of a position control means such as means 38. However in its basic form as shown in a second embodiment, the invention is operable manually.

Figures 5, 6:
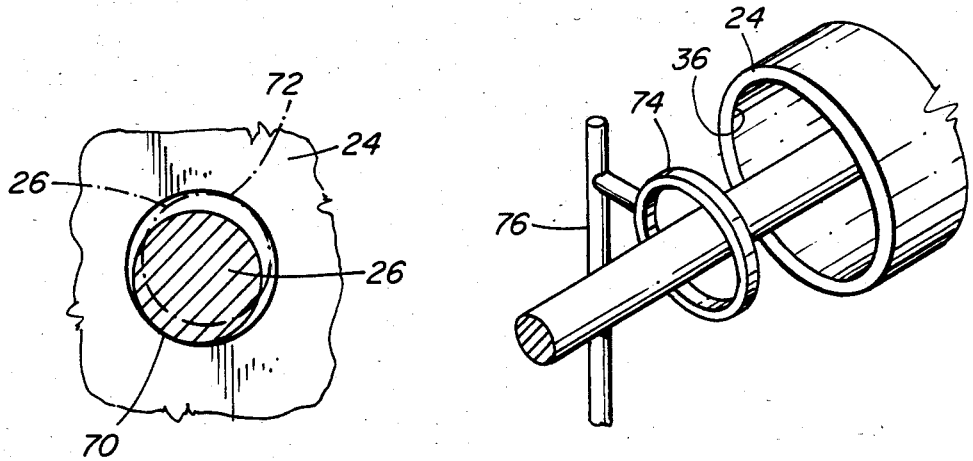
FIG. 5 is a view in the direction of arrow V in FIG. 3 of an end of the die insert.
FIG. 6 is an isometric view of part of a second embodiment.

As shown in the second embodiment in FIG. 6 the means 38 is replaced by a simple guide ring 74 which is mounted upon a stand 76 for passage of the conductor through the ring. With the ring disposed in a certain vertical or horizontal location, the conductor makes its approach angle through the die insert 24 and towards the orifice 30 as described in the first embodiment so as to achieve concentricity with the die orifice. In this case the means 66 may produce readings upon a display for use by an operator. If these readings are such as to indicate substantial concentricity between the conductor and its insulation then the operator will have no need to interfere with the apparatus. However once the readings indicate that eccentricity of the conductor is occurring beyond a certain limit, then the operator merely moves the ring 66 upon the stand 76 in any particular direction so as to adjust the angle of approach of the conductor 26 towards the orifice 30 until he is informed by the display that the conductor is again substantially concentric with the insulation.

What is claimed is:

1. A method of forming an insulation layer upon an electrical conductor comprising:

passing the conductor along a feedpath through a passage of a die insert with lateral clearance, towards an outlet orifice of the die insert and also, with lateral clearance, through the outlet orifice while lying in contact with a part only of the surface of the insert which defines the orifice, and passing the conductor through a die orifice to extrude onto it elastomeric material for forming the layer while contact of the conductor with said surface part of the insert guides the conductor into a particular lateral position as it passes through the orifice;

monitoring the radial position of the conductor within the layer; and controllably moving the conductor laterally of its feedpath at a position upstream from the outlet orifice of the die insert dependent upon the eccentricity of the conductor by combining movements of the conductor in two planes so as to cause the conductor to change its angle of approach to the outlet orifice to alter the angle of departure from the outlet orifice and hence its lateral position within the die orifice to achieve concentricity of the conductor within and surrounding clearance from a surface defining the die orifice.

2. Apparatus for forming an insulating layer upon an electrical conductor comprising an extruder having an extruder head provided with a die orifice and a die insert within the head, the insert having an outlet orifice for passage of the conductor along its feedpath towards the die orifice, and upstream of the outlet orifice, the apparatus defines a passage of larger section than the outlet orifice to allow for lateral clearance for the conductor on its feedpath, monitoring means to monitor the radial position of the conductor within the layer, and means to controllably move the conductor laterally of its feedpath within two planes and within the larger section passage so as to change the angle of approach of the conductor towards the outlet orifice.

3. Apparatus according to claim 2 wherein the means to controllably move the conductor comprises a control member formed with a guide surface, the member movable upon a mounting member in one plane by a first moving means to move the guide surface in said one plane, the mounting member movable in another plane by a second moving means so as to effect movement of the control member and the guide surface in said other plane.

* * * * *